(12) United States Patent
Fukuoka et al.

(10) Patent No.: US 9,064,519 B2
(45) Date of Patent: Jun. 23, 2015

(54) SOFT MAGNETIC UNDER LAYER

(75) Inventors: Jun Fukuoka, Yasugi (JP); Kazuya Saitoh, Yasugi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 13/816,789

(22) PCT Filed: Jul. 5, 2012

(86) PCT No.: PCT/JP2012/067150
§ 371 (c)(1),
(2), (4) Date: Feb. 13, 2013

(87) PCT Pub. No.: WO2013/005785
PCT Pub. Date: Jan. 10, 2013

(65) Prior Publication Data
US 2013/0143072 A1 Jun. 6, 2013

(30) Foreign Application Priority Data
Jul. 6, 2011 (JP) .................. 2011-149879

(51) Int. Cl.
*G11B 5/667* (2006.01)
*H01F 10/32* (2006.01)

(52) U.S. Cl.
CPC .............. *G11B 5/667* (2013.01); *H01F 10/324* (2013.01)

(58) Field of Classification Search
None
See application file for complete search history.

(56) References Cited

U.S. PATENT DOCUMENTS

| | | | |
|---|---|---|---|
| 2002/0028356 A1 | 3/2002 | Kawato et al. | |
| 2004/0234818 A1 | 11/2004 | Tanahashi et al. | |
| 2005/0042479 A1* | 2/2005 | Tanahashi et al. | 428/694 TM |
| 2005/0214587 A1 | 9/2005 | Kawato et al. | |
| 2005/0244679 A1 | 11/2005 | Arai et al. | |
| 2006/0001996 A1* | 1/2006 | Aoyagi et al. | 360/55 |
| 2008/0124579 A1* | 5/2008 | Kaitsu et al. | 428/800 |
| 2008/0199734 A1* | 8/2008 | Ajan et al. | 428/828 |
| 2011/0032638 A1 | 2/2011 | Arai et al. | |

(Continued)

FOREIGN PATENT DOCUMENTS

| | | |
|---|---|---|
| JP | 2001-331920 | 11/2001 |
| JP | 2003-0679090 | 3/2003 |

(Continued)

OTHER PUBLICATIONS

Search report from International Application No. PCT/JP2012/067150, mail date is Oct. 9, 2012.

*Primary Examiner* — Kevin Bernatz
(74) *Attorney, Agent, or Firm* — Greenblum & Bernstein, P.L.C.

(57) ABSTRACT

A soft magnetic under layer has a low antiferromagnetic coupling force and a high saturation magnetic flux density. The soft magnetic under layer includes two soft magnetic layers and a spacer layer. The soft magnetic layers are expressed by a composition formula as $(Fe_{100-X}Co_X)_{100-Y}M_Y$ by atomic ratio, wherein $15 \leq X \leq 30$, $10 \leq Y \leq 30$, and an element M is at least one element selected from a group of Ta, Ti, Zr, Nb, Cr, and B; are composed of residual incidental impurities; and each have a thickness of 10 to 50 nm. The spacer layer is composed of one element selected from a group of Ru, Cr, Cu, Re, and Rh and has a thickness of 0.10 to 0.50 nm. The soft magnetic layers are antiferromagnetically coupled through the spacer layer inserted therebetween. An antiferromagnetic coupling force between the soft magnetic layers is 100 to 4,000 A/m.

4 Claims, 1 Drawing Sheet

(56) References Cited

U.S. PATENT DOCUMENTS

| | | |
|---|---|---|
| 2011/0143168 A1 | 6/2011 | Ueno et al. |
| 2011/0151144 A1 | 6/2011 | Arai et al. |
| 2011/0235211 A1* | 9/2011 | Singh et al. .................. 360/110 |

FOREIGN PATENT DOCUMENTS

| | | |
|---|---|---|
| JP | 2003-203326 | 7/2003 |
| JP | 2004-348777 | 12/2004 |
| JP | 2005-302238 | 10/2005 |
| JP | 2006-190486 | 7/2006 |
| JP | 2008-77765 | 4/2008 |
| JP | 4101836 | 6/2008 |
| JP | 2008-276859 | 11/2008 |
| JP | 4409085 | 2/2010 |
| JP | 2011-100523 | 5/2011 |
| WO | 2009/104509 | 8/2009 |

\* cited by examiner

SOFT MAGNETIC UNDER LAYER

TECHNICAL FIELD

The present invention relates to a soft magnetic under layer for a perpendicular magnetic recording medium.

BACKGROUND ART

High density magnetic recording is highly sought after in advanced information societies these days. In place of a conventional longitudinal magnetic recording system, a perpendicular magnetic recording system is in practical use as a technology to achieve high density.

In the perpendicular magnetic recording system, a magnetic layer of a perpendicular magnetic recording medium is formed such that an axis of easy magnetization is oriented perpendicular to a medium plane. The system is suitable for high density recording due to a small demagnetizing field in a bit, even at an increased recording density, and a limited reduction in read/write properties. For the perpendicular magnetic recording system, a recording medium is developed having a magnetic recording layer and a soft magnetic under layer with increased recording sensitivity.

The soft magnetic under layer, which returns a recording magnetic field from a magnetic head, must have a high saturation magnetic flux density to efficiently draw in a recording magnetic field and must have a high magnetic permeability to enhance writability to a magnetic recording medium (refer to Patent Literatures 1 and 2, for example). High surface roughness of the soft magnetic under layer leads to high surface roughness of the perpendicular magnetic recording medium, thus increasing flying height of the magnetic head and deteriorating reproducing sensitivity. Thus, the soft magnetic under layer must have an amorphous structure having excellent surface smoothness (refer to Patent Literature 3, for example).

A soft magnetic under layer is suggested having a structure in which a plurality of soft magnetic layers are antiferromagnetically coupled through non-magnetic spacer layers inserted therebetween. The structure prevents a leakage magnetic flux generated from a magnetic wall of the soft magnetic layer from flowing into a reproducing head and fixates the magnetic wall existing in the soft magnetic layer so as not to be easily moved, thus reducing noise (refer to Patent Literature 4, for example). In such a soft magnetic under layer, a material having a high saturation magnetic flux density is suggested for use in the soft magnetic layer to enhance writability. Antiferromagnetic coupling within a range of 30% to 70% of a maximum value of an antiferromagnetic coupling force, which varies depending on the thickness of the spacer layer inserted between the soft magnetic layers, is suggested for improving high-speed response to high-frequency signals (refer to Patent Literature 5, for example).

A Co—Fe—Al alloy or the like is suggested as a material for the soft magnetic layer of the conventional perpendicular magnetic recording medium (refer to Patent Literatures 6 to 8, for example).

CITATION LIST

Patent Literature

[Patent Literature 1] Japanese Patent Laid-Open Publication No. 2006-190486
[Patent Literature 2] Japanese Patent Publication No. 4409085
[Patent Literature 3] Japanese Patent Laid-Open Publication No. 2008-276859
[Patent Literature 4] Japanese Patent Laid-Open Publication No. 2001-331920
[Patent Literature 5] Japanese Patent Laid-Open Publication No. 2011-100523
[Patent Literature 6] Japanese Patent Publication No. 4101836
[Patent Literature 7] International Publication No. WO2009/104509
[Patent Literature 8] Japanese Patent Laid-Open Publication No. 2003-0679090

SUMMARY OF INVENTION

Technical Problem

The soft magnetic under layer disclosed in Patent Literature 5 above pertains to a method of antiferromagnetically coupling within the range of 30% to 70% of the maximum value of the antiferromagnetic coupling force. The method is effective to enhance high-frequency responsiveness of the soft magnetic under layer; however, a structure that yields the maximum value of the antiferromagnetic coupling force is not used, and thus a variation of the antiferromagnetic coupling force is increased corresponding to the film thickness of the spacer layer, thus possibly destabilizing the antiferromagnetic coupling force.

The Co—Fe—Al alloy for the soft magnetic layer disclosed in Patent Literature 6 is advantageous in view of high saturation magnetic flux density. However, the alloy, which has a high maximum value of the antiferromagnetic coupling force, reduces magnetic permeability toward high-frequency signals and thus adversely affects writability of a magnetic recording medium.

An object of the present invention is to provide a soft magnetic under layer for a perpendicular magnetic recording medium, the soft magnetic under layer having a low maximum value of antiferromagnetic coupling force even in a structure that yields the maximum value thereof and having a high saturation magnetic flux density.

Solution to Problem

The inventors have reached the present invention, directed to a soft magnetic under layer used for a perpendicular magnetic recording medium, based on findings of a preferable composition range for a soft magnetic under layer having a low maximum value of antiferromagnetic coupling force and a high saturation magnetic flux density through a variety of studies on composition ratios of Fe and Co, elements added to an Fe—Co alloy, and ranges of the addition.

Specifically, the present invention relates to a soft magnetic under layer including two soft magnetic layers and a spacer layer. The soft magnetic layers are expressed by a composition formula as $(Fe_{100-X}Co_X)_{100-Y}M_Y$ by atomic ratio, wherein $15 \leq X \leq 30$, $10 \leq Y \leq 30$, and an element M is at least one element selected from a group of Ta, Ti, Zr, Nb, Cr, and B. The soft magnetic layers are composed of residual incidental impurities and each have a thickness of 10 to 50 nm. The spacer layer is composed of one element selected from a group of Ru, Cr, Cu, Re, and Rh and has a thickness of 0.10 to 0.50 nm. The soft magnetic layers are antiferromagnetically coupled through the spacer layer inserted therebetween. An antiferromagnetic coupling force between the soft magnetic layers is 100 to 4,000 A/m.

The spacer layer is preferably composed of Ru.

A thickness of the spacer layer is preferably defined such that an absolute of a difference from a thickness of the spacer layer yielding a maximum value of the antiferromagnetic coupling force is less than 0.05 nm.

Advantageous Effects of Invention

The present invention provides a soft magnetic under layer including an Fe—Co alloy used for a perpendicular magnetic recording medium, the soft magnetic under layer having a low antiferromagnetic coupling force and a high saturation magnetic flux density. The present invention serves as an effective technology in manufacturing perpendicular magnetic recording media.

DESCRIPTION OF EMBODIMENTS

As described above, an essential feature of the present invention lies in the finding of an optimum composition range for a soft magnetic under layer to achieve a low maximum value of antiferromagnetic coupling force and a high saturation magnetic flux density.

First, an Fe—Co alloy is described as a base to form a soft magnetic layer of the present invention.

The Fe—Co alloy, which is a base to form the soft magnetic layer of the present invention, is expressed by a composition formula as ($Fe_{100-X}Co_X$) by atomic ratio, wherein $15 \leq X \leq 30$.

Figure 2:
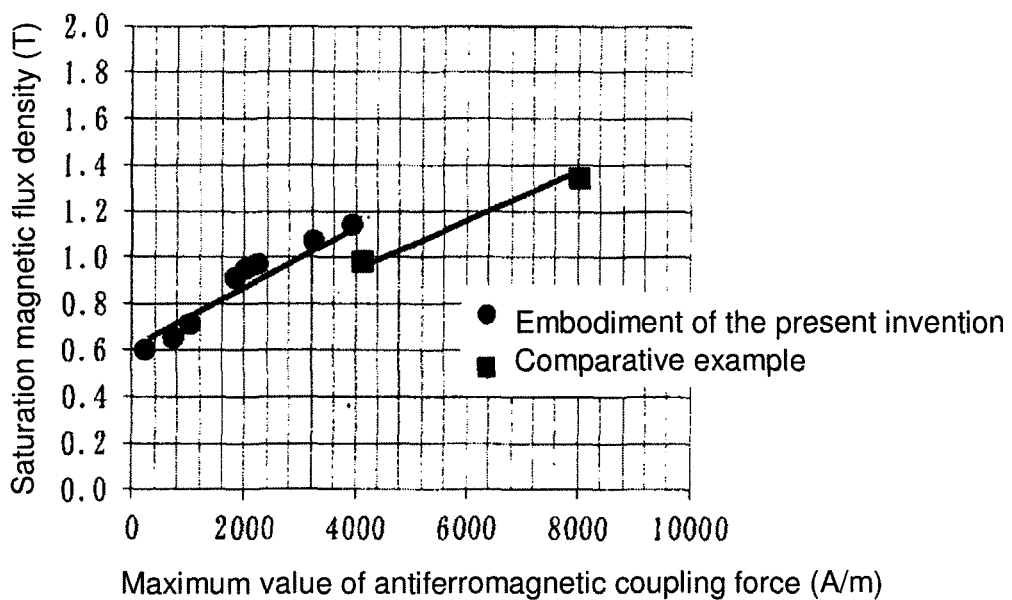
FIG. 2 A diagram illustrating a relationship between a maximum peak of antiferromagnetic coupling force and saturation magnetic flux density.

A proportional relationship as shown in FIG. 2 (comparative example) is confirmed between an antiferromagnetic coupling force and a saturation magnetic flux density in a Co—Fe alloy. To reduce the antiferromagnetic coupling force by a conventional method, the saturation magnetic flux density should be defined low.

In the soft magnetic layer of the present invention, whereas a proportional relationship is established between the antiferromagnetic coupling force and the saturation magnetic flux density due to the Fe-rich composition range above, the antiferromagnetic coupling force can be reduced with the saturation magnetic flux density maintained at a higher level than a conventional Co—Fe alloy. In a case where the Co to Fe atomic ratio in the soft magnetic layer is less than 15%, the saturation magnetic flux density of the Fe—Co alloy which is the base is low. Meanwhile, in a case where the Co to Fe atomic ratio in the soft magnetic layer exceeds 30%, the antiferromagnetic coupling force cannot be reduced while the saturation magnetic flux density is maintained at a high level. Thus, the Co to Fe atomic ratio of the present invention is defined within a range of 15% to 30%.

The soft magnetic layer of the present invention includes at least one element selected from a group of Ta, Ti, Zr, Nb, Cr, and B at 10 to 30 atomic % in total as an element M added to the Fe—Co alloy above. The added element M of Ta, Ti, Zr, Nb, Cr, or B of the present invention is prepared such that the saturation magnetic flux density falls within a range to achieve both noise reduction and writability improvement of a magnetic recording medium. The element M is added in a predetermined amount to achieve the antiferromagnetic coupling force in a predetermined range that enhances magnetic permeability relative to high-frequency signals.

With the added amount of the element M at less than 10 atomic %, the saturation magnetic flux density is difficult to regulate to the predetermined range and an effect is not sufficient to regulate the antiferromagnetic coupling force to the predetermined range. Meanwhile, with the added amount of the element M exceeding 30 atomic %, the saturation magnetic flux density is excessively low, thus making noise reduction difficult and reducing writability of the magnetic recording medium. Accordingly, the added amount of the element M is defined within a range of 10% to 30% in the present invention.

Ta, Zr, Nb, and B of the elements M exhibit a eutectic equilibrium phase diagram relative to the base elements Fe and Co and thus are effective elements to form an amorphous state. Ta and Nb are homogenous elements and have a similar binary equilibrium phase diagram to Fe or Co, thus achieving substantially a similar effect. Ti and Cr of the elements M are effective in improving anticorrosion performance of the soft magnetic under layer. In the present invention, a total added amount of Ta, Zr, Nb, and B is preferably 5 atomic % or greater to promote formation of an amorphous state in the soft magnetic under layer. Furthermore, the Fe—Co alloy included in the soft magnetic layer of the present invention may decrease in anticorrosion performance due to an Fe content greater than that of the conventional Co—Fe alloy. Thus, a total added amount of Ti and Cr is preferably 5 atomic % or greater.

In the soft magnetic under layer of the present invention, the two soft magnetic layers each have a film thickness of 10 to 50 nm. A film thickness of the soft magnetic layer of less than 10 nm significantly reduces recording efficiency in magnetic recording due to the thinness of the film, thus leading to a problem where magnetization reversal of a recording bit is not ensured. A film thickness exceeding 50 nm increases film stress, thus leading to easy peel-off of a film, and requires time for film formation, thus reducing productivity.

In the soft magnetic under layer of the present invention, the above-described soft magnetic layers are antiferromagnetically coupled by the spacer layer that has a thickness of 0.10 to 0.50 nm and is composed of one element selected from a group of non-magnetic elements Ru, Cr, Cu, Re, and Rh. The elements Ru, Cr, Cu, Re, and Rh are selected for the spacer layer because adjacent soft magnetic layers can be antiferromagnetically coupled through such a thin non-magnetic spacer layer inserted therebetween. Thus, the soft magnetic under layer of the present invention can reduce noise attributed to the soft magnetic under layer. The spacer layer applied in the present invention is preferably composed of Ru, which achieves particularly stable antiferromagnetic coupling among the non-magnetic elements above.

With the film thickness of the spacer layer at less than 0.10 nm, the soft magnetic layers are not antiferromagnetically coupled. An increase in the film thickness of the spacer layer reduces the antiferromagnetic coupling force vibrationally. Thus, sufficient antiferromagnetic coupling force is not achieved with a film thickness of the spacer layer exceeding 0.50 nm. Accordingly, the film thickness of the spacer layer is defined between 0.10 and 0.50 nm in the present invention.

The film thickness of the spacer layer yielding a maximum value of the antiferromagnetic coupling force is different depending on a material of the soft magnetic layer. Thus, the film thickness is preferably defined in the range of 0.10 to 0.50 nm at less than ±0.05 nm relative to the film thickness yielding the maximum value of the antiferromagnetic coupling force. When the film thickness of the spacer layer varies beyond ±0.05 nm relative to the film thickness yielding the maximum value of the antiferromagnetic coupling force, the antiferromagnetic coupling force is difficult to regulate to a predetermined range (described later).

The film thickness of the spacer layer may be defined, for example, by preparing a specimen on which a spacer layer having a thickness of 150 nm is formed on a portion of a surface of a glass substrate, scanning with a stylus of a stylus profilometer to measure a gap (film thickness) between the glass substrate and the spacer layer, and then obtaining a film forming rate from the film thickness and film forming time. With the obtained film forming rate as a reference, the film forming time is controlled to form a film having a predetermined film thickness. The film thickness of the spacer layer may be measured, for example, by observing with a transmission electron microscope a cross section of the specimen on which the spacer film is formed.

The antiferromagnetic coupling force of the soft magnetic under layer of the present invention is defined at 100 to 4,000 A/m. An antiferromagnetic coupling force of less than 100 A/m increases a leakage magnetic flux from the soft magnetic under layer, thus deteriorating readability of the magnetic recording medium. Meanwhile, an antiferromagnetic coupling force exceeding 4,000 A/m reduces the magnetic permeability of the soft magnetic under layer relative to high-frequency signals, thus deteriorating responsiveness of the soft magnetic under layer and writability of the magnetic recording medium. Defining the antiferromagnetic coupling force of the soft magnetic under layer of the present invention at a specific range of 100 to 4,000 A/m improves the magnetic permeability relative to high-frequency signals and enhances writability of the magnetic recording medium.

The soft magnetic under layer of the present invention can be formed by vacuum deposition, sputtering, or chemical vapor deposition, for instance. Among the methods of formation, sputtering is preferred in which targets having the same compositions as the soft magnetic layer and the spacer layer respectively are prepared and a thin film is formed by sputtering. This forms a stable film at a high speed.

An Fe—Co alloy target forming the soft magnetic layer can be produced, for example, by melting and casting or by powder sintering. In the melting and casting, a casted ingot or a bulk body formed by plastic forming or pressurizing a casted ingot can be machined to produce the Fe—Co alloy target.

In the powder sintering, alloy powders having a final composition of the Fe—Co alloy can be prepared by gas atomization for use, for example. Alternatively, mixed powders can be used, the mixed powders being provided by preparing a plurality of alloy powders and pure metal powders by gas atomization, for example, and mixing the powders so as to have the final composition of the Fe—Co alloy. Raw material powders can be pressurized and sintered, for example, by hot isostatic pressing, hot pressing, spark plasma sintering, and extrusion press sintering.

EMBODIMENTS

The present invention is described in detail in embodiments below.

Embodiment 1 of the Present Invention

In order to prepare an Fe—Co alloy target for forming a soft magnetic layer, gas atomized powders each having a purity of 99.9% or greater and having alloy compositions of $Fe_{92}$—$Ta_8$ (atomic %), $Fe_{90}$—$Zr_{10}$ (atomic %), $Fe_{70}$—$B_{30}$ (atomic %), $Co_{62.3}$—$Fe_{26.7}$—$Ta_3$—$Zr_5$—$Ti_3$ (atomic %), and $Co_{88}$—$Ta_{10}$—$Zr_2$ (atomic %); and a Ti powder having a purity of 99.9% or greater were prepared. The powders were weighed and mixed to produce a mixed powder having an alloy composition of $(Fe_{80}$—$Co_{20})_{85}$—$Ta_3$—$Zr_5$—$Ti_3$—$B_4$ by atomic ratio. Subsequently, the produced mixed powder was filled in a soft steel capsule, and then degassed and sealed. Then, the mixed powder was sintered by hot isostatic pressing at a temperature of 950° C., a pressure of 122 MPa, and a hold time of two hours to produce a sintered body. The produced sintered body was machined to produce an Fe—Co alloy target having a diameter of 180 mm and a thickness of 4.0 mm.

In order to prepare a Ru target for forming a spacer layer, a Ru powder having a purity of 99.9% or greater was filled in a soft steel capsule, and then degassed and sealed. Then, the powder was sintered by hot isostatic pressing at a temperature of 1,300° C., a pressure of 150 MPa, and a hold time of three hours to produce a sintered body. The produced sintered body was machined to produce a Ru target having a diameter of 180 mm and a thickness of 8.5 mm.

The produced Fe—Co alloy target and Ru target were placed in chamber 1 and chamber 2, respectively, of a DC magnetron sputtering system (Canon Anelva 3010). Then, air was exhausted until a vacuum attainment level reached $2 \times 10^{-5}$ Pa or less in each chamber. Thereafter, a soft magnetic layer having a film thickness of 40 nm was formed on a glass substrate having dimensions of 75 mm×25 mm to produce a specimen for X-ray diffraction measurement.

Furthermore, a soft magnetic layer of 20 nm and a Ru spacer layer of 0.00 to 0.60 nm in increments of 0.05 nm were formed on a glass substrate having a diameter of 10 mm. Then, a soft magnetic layer of 20 nm was formed on an upper surface thereof to produce a specimen for magnetic property evaluation. The soft magnetic layers were formed by sputtering at an Ar gas pressure of 0.6 Pa and a supply power of 1 kW. The spacer layer was formed by sputtering at an Ar gas pressure of 0.6 Pa and a supply power of 50 W.

The film thickness of the spacer layer was defined by first preparing a specimen on which a spacer layer of 150 nm was formed, measuring an accurate film thickness using a stylus profilometer, and calculating a film forming rate from the film thickness and film forming time. With the calculated film forming rate as a reference, the film forming time was adjusted to form a film of a predetermined film thickness. For the film thickness of the spacer layer, a film thickness was employed yielding a maximum antiferromagnetic coupling force when the film thickness was varied by 0.05 nm. Thus, a specimen for magnetic property evaluation was obtained as Embodiment 1 of the present invention.

Embodiment 2 of the Present Invention

In order to prepare an Fe—Co alloy target for forming a soft magnetic layer, gas atomized powders each having a purity of 99.9% or greater and having alloy compositions of $Fe_{92}$—$Ta_8$ (atomic %), $Fe_{90}$—$Zr_{10}$ (atomic %), $Fe_{70}$—$B_{30}$ (atomic %), $Co_{62.3}$—$Fe_{26.7}$—$Ta_3$—$Zr_5$—$Ti_3$ (atomic %), and $Co_{88}$—$Ta_{10}$—$Zr_2$ (atomic %); and a Ti powder having a purity of 99.9% or greater were prepared. The powders were weighed and mixed to produce a mixed powder having an alloy composition of $(Fe_{90}$—$Co_{10})_{86}$—$Ta_3$—$Zr_5$—$Ti_2$—$B_4$ by atomic ratio.

The produced mixed powder was filled in a soft steel capsule, and then degassed and sealed. Then, the mixed powder was sintered by hot isostatic pressing at a temperature of 950° C., a pressure of 122 MPa, and a hold time of two hours to produce a sintered body. The produced sintered body was machined to produce an Fe—Co alloy target having a diameter of 180 mm and a thickness of 4.0 mm.

Using the Fe—Co alloy target and Ru target produced above, specimens for X-ray diffraction measurement and magnetic property evaluation were produced under the same conditions as those in Embodiment 1 of the present invention.

Embodiment 3 of the Present Invention

In order to prepare an Fe—Co alloy target for forming a soft magnetic layer, gas atomized powders each having a purity of 99.9% or greater and having alloy compositions of $Fe_{92}$—$Ta_8$ (atomic %), $Fe_{90}$—$Zr_{10}$ (atomic %), $Fe_{70}$—$B_{30}$ (atomic %), Co, and $Co_{88}$—$Ta_{10}$—$Zr_2$ (atomic %); and a Cr powder having a purity of 99.9% or greater were prepared. The powders were weighed and mixed to produce a mixed powder having an alloy composition of $(Fe_{80}$—$Co_{20})_{82}$—$Ta_3$—$Zr_5$—$Cr_6$—$B_4$ by atomic ratio.

The produced mixed powder was filled in a soft steel capsule, and then degassed and sealed. Then, the mixed powder was sintered by hot isostatic pressing at a temperature of 950° C., a pressure of 122 MPa, and a hold time of two hours to produce a sintered body. The produced sintered body was machined to produce an Fe—Co alloy target having a diameter of 180 mm and a thickness of 4.0 mm.

Using the Fe—Co alloy target and Ru target produced above, specimens for X-ray diffraction measurement and magnetic property evaluation were produced under the same conditions as those in Embodiment 1 of the present invention.

Embodiment 4 of the Present Invention

In order to prepare an Fe—Co alloy target for forming a soft magnetic layer, gas atomized powders each having a purity of 99.9% or greater and having alloy compositions of $Fe_{92}$—$Ta_8$ (atomic %), $Fe_{90}$—$Zr_{10}$ (atomic %), $Fe_{70}$—$B_{30}$ (atomic %), and $Co_{62.3}$—$Fe_{26.7}$—$Ta_3$—$Zr_5$—$Ti_3$ (atomic %); and a Ta powder, a Ti powder, and a Cr powder each having a purity of 99.9% or greater were prepared. The powders were weighed and mixed to produce a mixed powder having an alloy composition of $(Fe_{75}$—$Co_{25})_{77}$—$Ta_3$—$Zr_5$—$Ti_9$—$Cr_6$ by atomic ratio.

The produced mixed powder was filled in a soft steel capsule, and then degassed and sealed. Then, the mixed powder was sintered by hot isostatic pressing at a temperature of 950° C., a pressure of 122 MPa, and a hold time of two hours to produce a sintered body. The produced sintered body was machined to produce an Fe—Co alloy target having a diameter of 180 mm and a thickness of 4.0 mm.

Using the Fe—Co alloy target and Ru target produced above, specimens for X-ray diffraction measurement and magnetic property evaluation were produced under the same conditions as those in Embodiment 1 of the present invention.

Embodiment 5 of the Present Invention

In order to prepare an Fe—Co alloy target for forming a soft magnetic layer, gas atomized powders each having a purity of 99.9% or greater and having alloy compositions of $Fe_{92}$—$Ta_8$ (atomic %), $Fe_{90}$—$Zr_{10}$ (atomic %), $Fe_{70}$—$B_{30}$ (atomic %), and $Co_{62}$—$Fe_{27}$—$Ta_3$—$Zr_5$—$Ti_3$ (atomic %); and a Ta powder, a Ti powder, and a Cr powder each having a purity of 99.9% or greater were prepared. The powders were weighed and mixed to produce a mixed powder having an alloy composition of $(Fe_{75}$—$Co_{25})_{77}$—$Ta_3$—$Zr_5$—$Ti_6$—$Cr_9$ by atomic ratio.

The produced mixed powder was filled in a soft steel capsule, and then degassed and sealed. Then, the mixed powder was sintered by hot isostatic pressing at a temperature of 950° C., a pressure of 122 MPa, and a hold time of two hours to produce a sintered body. The produced sintered body was machined to produce an Fe—Co alloy target having a diameter of 180 mm and a thickness of 4.0 mm.

Using the Fe—Co alloy target and Ru target produced above, specimens for X-ray diffraction measurement and magnetic property evaluation were produced under the same conditions as those in Embodiment 1 of the present invention.

Embodiment 6 of the Present Invention

In order to prepare an Fe—Co alloy target for forming a soft magnetic layer, gas atomized powders each having a purity of 99.9% or greater and having alloy compositions of $Fe_{92}$—$Ta_8$ (atomic %), $Fe_{90}$—$Zr_{10}$ (atomic %), $Fe_{70}$—$B_{30}$ (atomic %), and $Co_{62}$—$Fe_{27}$—$Ta_3$—$Zr_5$—$Ti_3$ (atomic %); and a Ta powder, a Ti powder, and a Cr powder each having a purity of 99.9% or greater were prepared. The powders were weighed and mixed to produce a mixed powder having an alloy composition of $(Fe_{75}$—$Co_{25})_{77}$—$Ta_3$—$Zr_5$—$Ti_3$—$Cr_{12}$ by atomic ratio.

The produced mixed powder was filled in a soft steel capsule, and then degassed and sealed. Then, the mixed powder was sintered by hot isostatic pressing at a temperature of 950° C., a pressure of 122 MPa, and a hold time of two hours to produce a sintered body. The produced sintered body was machined to produce an Fe—Co alloy target having a diameter of 180 mm and a thickness of 4.0 mm.

Using the Fe—Co alloy target and Ru target produced above, specimens for X-ray diffraction measurement and magnetic property evaluation were produced under the same conditions as those in Embodiment 1 of the present invention.

Embodiment 7 of the Present Invention

In order to prepare an Fe—Co alloy target for forming a soft magnetic layer, gas atomized powders each having a purity of 99.9% or greater and having alloy compositions of $Fe_{92}$—$Ta_8$ (atomic %), $Fe_{90}$—$Zr_{10}$ (atomic %), Co, $Co_{88}$—$Ta_{10}$—$Zr_2$ (atomic %), and $Co_{63}$—$B_{37}$ (atomic %); and a Ti powder having a purity of 99.9% or greater were prepared. The powders were weighed and mixed to produce a mixed powder having an alloy composition of $(Fe_{70}$—$Co_{30})_{79}$—$Ta_3$—$Zr_5$—$Ti_9$—$B_4$ by atomic ratio.

The produced mixed powder was filled in a soft steel capsule, and then degassed and sealed. Then, the mixed powder was sintered by hot isostatic pressing at a temperature of 950° C., a pressure of 122 MPa, and a hold time of two hours to produce a sintered body. The produced sintered body was machined to produce an Fe—Co alloy target having a diameter of 180 mm and a thickness of 4.0 mm.

Using the Fe—Co alloy target and Ru target produced above, specimens for X-ray diffraction measurement and magnetic property evaluation were produced under the same conditions as those in Embodiment 1 of the present invention.

Embodiment 8 of the Present Invention

In order to prepare an Fe—Co alloy target for forming a soft magnetic layer, gas atomized powders each having a purity of 99.9% or greater and having alloy compositions of $Fe_{92}$—$Ta_8$ (atomic %), $Fe_{90}$—$Zr_{10}$ (atomic %), $Fe_{70}$—$B_{30}$ (atomic %), $Co_{88}$—$Ta_{10}$—$Zr_2$ (atomic %) and $Co_{63}$—$B_{37}$ (atomic %); and a Ti powder having a purity of 99.9% or greater were prepared. The powders were weighed and mixed to produce a mixed powder having an alloy composition of $(Fe_{75}$—$Co_{25})_{79}$—$Ta_3$—$Zr_5$—$Ti_9$—$B_4$ by atomic ratio.

The produced mixed powder was filled in a soft steel capsule, and then degassed and sealed. Then, the mixed powder was sintered by hot isostatic pressing at a temperature of 950° C., a pressure of 122 MPa, and a hold time of two hours to produce a sintered body. The produced sintered body was machined to produce an Fe—Co alloy target having a diameter of 180 mm and a thickness of 4.0 mm.

Using the Fe—Co alloy target and Ru target produced above, specimens for X-ray diffraction measurement and magnetic property evaluation were produced under the same conditions as those in Embodiment 1 of the present invention.

Comparative Example 1

In order to prepare a Co—Fe alloy target for forming a soft magnetic layer, a gas atomized powder having a purity of 99.9% and an alloy composition of $(Co_{70}$—$Fe_{30})_{90}$—$Ta_3$—$Zr_5$—$Al_2$ (atomic %) was filled in a soft steel capsule, and then degassed and sealed. Then, the powder was sintered by hot isostatic pressing at a temperature of 950° C., a pressure of 122 MPa, and a hold time of two hours to produce a sintered body.

The produced sintered body was machined to produce a Co—Fe alloy target having a diameter of 180 mm and a thickness of 5.0 mm.

Using the Co—Fe alloy target and Ru target produced above, specimens for X-ray diffraction measurement and magnetic property evaluation were produced under the same conditions as those in Embodiment 1 of the present invention.

Comparative Example 2

In order to prepare a Co—Fe alloy target for forming a soft magnetic layer, gas atomized powders each having a purity of 99.9% or greater and having alloy compositions of Co, $Co_{90}$—$Zr_{10}$, $Co_{88}$—$Ta_{10}$—$Zr_2$, $Fe_{90}$—$Zr_{10}$ (atomic %), and $Fe_{70}$—$B_{30}$ (atomic %); and a Ti powder having a purity of 99.9% or greater were prepared. The powders were weighed and mixed to produce a mixed powder having an alloy composition of $(Fe_{50}$—$Co_{50})_{80}$—$Ta_3$—$Zr_5$—$Ti_8$—$B_4$ by atomic ratio.

The produced mixed powder was filled in a soft steel capsule, and then degassed and sealed. Then, the mixed powder was sintered by hot isostatic pressing at a temperature of 950° C., a pressure of 122 MPa, and a hold time of two hours to produce a sintered body. The produced sintered body was machined to produce a Co—Fe alloy target having a diameter of 180 mm and a thickness of 4.0 mm.

Using the Co—Fe alloy target and Ru target produced above, specimens for X-ray diffraction measurement and magnetic property evaluation were produced under the same conditions as those in Embodiment 1 of the present invention.

X-ray diffraction was measured for each of the specimens for X-ray diffraction measurement used to form the soft magnetic layers above with a Rigaku X-ray diffraction system RINT 2500V and Co as a radiation source. As a result, X-ray diffraction patterns of all specimens showed a broad peak, confirming that the soft magnetic layers have an amorphous structure.

Subsequently, a B-H curve was measured for each of the specimens for magnetic property evaluation above by applying a maximum magnetic field of 10,000 A/m in a direction of a longitudinal axis of easy magnetization with a Toei Industry vibrating sample magnetometer VSM-3. Representative B-H curves of antiferromagnetically coupled soft magnetic under layers are shown in FIG. 1.

Figure 1:
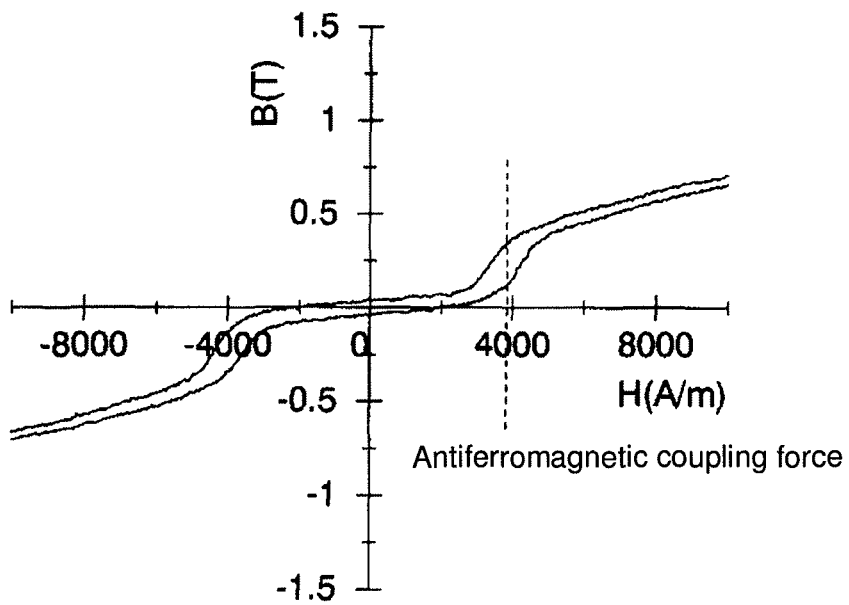
FIG. 1 An example of a B-H curve of a soft magnetic under layer according to the present invention.

The B-H curves in FIG. 1 demonstrate that residual magnetic flux density proximate to a zero applied magnetic field was substantially zero, confirming that two soft magnetic layers were antiferromagnetically coupled. An antiferromagnetic coupling force is defined as an applied magnetic field where magnetization starts from this state of stable antiferromagnetic coupling. Table 1 shows a maximum value of the antiferromagnetic coupling force obtained from the B-H curve for each Ru film thickness, the Ru film thickness of a spacer layer at that time, and saturation magnetic flux density. FIG. 2 illustrates a relationship between the maximum value of the antiferromagnetic coupling force and the saturation magnetic flux density.

TABLE 1

|  | Soft magnetic layer composition (atomic %) | Antiferromagnetic coupling force maximum value (A/m) | Spacer layer Ru film thickness (nm) | Saturation magnetic flux density (T) |
| --- | --- | --- | --- | --- |
| Embodiment 1 | $(Fe_{80}$—$Co_{20})_{85}$—$Ta_3$—$Zr_5$—$Ti_3$—$B_4$ | 3,900 | 0.30 | 1.15 |
| Embodiment 2 | $(Fe_{90}$—$Co_{10})_{86}$—$Ta_3$—$Zr_5$—$Ti_2$—$B_4$ | 3,200 | 0.20 | 1.08 |
| Embodiment 3 | $(Fe_{80}$—$Co_{20})_{82}$—$Ta_3$—$Zr_5$—$Cr_6$—$B_4$ | 2,000 | 0.30 | 0.96 |
| Embodiment 4 | $(Fe_{75}$—$Co_{25})_{77}$—$Ta_3$—$Zr_5$—$Ti_9$—$Cr_6$ | 1,000 | 0.35 | 0.72 |
| Embodiment 5 | $(Fe_{75}$—$Co_{25})_{77}$—$Ta_3$—$Zr_5$—$Ti_9$—$Cr_9$ | 700 | 0.35 | 0.66 |
| Embodiment 6 | $(Fe_{75}$—$Co_{25})_{77}$—$Ta_3$—$Zr_5$—$Ti_3$—$Cr_{12}$ | 200 | 0.35 | 0.61 |
| Embodiment 7 | $(Fe_{70}$—$Co_{30})_{79}$—$Ta_3$—$Zr_5$—$Ti_9$—$B_4$ | 2,200 | 0.40 | 0.98 |
| Embodiment 8 | $(Fe_{75}$—$Co_{25})_{79}$—$Ta_3$—$Zr_5$—$Ti_9$—$B_4$ | 1,800 | 0.35 | 0.92 |
| Comparative Example 1 | $(Co_{70}$—$Fe_{30})_{90}$—$Ta_3$—$Zr_5$—$Al_2$ | 8,000 | 0.50 | 1.35 |
| Comparative Example 2 | $(Fe_{50}$—$Co_{50})_{80}$—$Ta_3$—$Zr_5$—$Ti_8$—$B_4$ | 4,100 | 0.45 | 0.99 |

As demonstrated in Table 1, soft magnetic under layers having soft magnetic layers composed of the Fe—Co alloys according to Embodiments 1 to 8 of the present invention had an antiferromagnetic coupling force of less than 4,000 A/m and achieved a high saturation magnetic flux density of 0.60 T or greater applicable to a soft magnetic under layer.

Meanwhile, soft magnetic under layers having soft magnetic layers composed of the Co—Fe alloys according to Comparative Examples 1 and 2 had high saturation magnetic flux density, but had an antiferromagnetic coupling force of greater than 4,000 A/m.

Furthermore, as demonstrated in FIG. 2, the soft magnetic under layers having a composition within a range of the present invention maintained a higher level of saturation magnetic flux density than the soft magnetic under layers of the Comparative Examples and concurrently reduced the antiferromagnetic coupling force, thus demonstrating suitability for a perpendicular magnetic recording medium.

The invention claimed is:

1. A soft magnetic under layer comprising:
    two soft magnetic layers; and
    a spacer layer,
    the soft magnetic layers being expressed by a composition formula as $(Fe_{100-X}Co_X)_{100-Y}\text{-}M_Y$ by atomic ratio, wherein $15 \le X \le 25$, $18 \le Y \le 23$, and an element M is at least one element selected from a group of Ta, Ti, Zr, Nb, Cr, and B,
    the soft magnetic layers each having a thickness of 10 to 50 nm,
    the spacer layer comprising one element selected from a group of Ru, Cr, Cu, Re, and Rh and having a thickness of 0.10 to 0.50 nm,
    the soft magnetic layers being antiferromagnetically coupled through the spacer layer inserted there between, wherein
    an antiferromagnetic coupling force between the soft magnetic layers is 100 to 2200 A/m.

2. The soft magnetic under layer according to claim 1, wherein the spacer layer comprises Ru.

3. The soft magnetic under layer according to claim 1, wherein a thickness of the spacer layer is defined such that an absolute value of a difference of the thickness of the spacer layer and the thickness of the spacer layer yielding a maximum value of the antiferromagnetic coupling force is less than 0.05 nm.

4. The soft magnetic under layer according to claim 2, wherein a thickness of the spacer layer is defined such that an absolute value of a difference of the thickness of the spacer layer and the thickness of the spacer layer yielding a maximum value of the antiferromagnetic coupling force is less than 0.05 nm.

* * * * *